United States Patent [19]

Lauper

[11] 4,058,018

[45] Nov. 15, 1977

[54] PRESSURE COMPENSATED FLEXIBLE BELLOWS

[75] Inventor: Warner R. Lauper, San Pedro, Calif.

[73] Assignee: Quadrastat Controls Corporation, Glendale, Calif.

[21] Appl. No.: 677,300

[22] Filed: Apr. 15, 1976

[51] Int. Cl.$^2$ ............................................. F16J 15/50
[52] U.S. Cl. .......................................... 74/18.2; 92/35
[58] Field of Search ......................... 92/35, 37, 38, 39; 74/18.1, 18.2

[56] References Cited

U.S. PATENT DOCUMENTS

| 2,002,870 | 5/1935 | Rockafellow | 92/37 |
| 2,265,546 | 12/1941 | Price | 74/18.2 |
| 2,593,292 | 4/1952 | Gaugler | 92/35 |
| 2,613,610 | 10/1952 | Saalfrank | 92/37 |
| 3,449,965 | 6/1969 | Ross | 74/18.2 |
| 3,890,967 | 6/1975 | Elam et al. | 92/39 |

Primary Examiner—Samuel Scott
Assistant Examiner—Wesley S. Ratliff, Jr.
Attorney, Agent, or Firm—Whann & McManigal

[57] ABSTRACT

A pressure compensated flexible extensile and retractile elongated tubular bellows having opposite ends arranged to be sealingly connected with members operatively movable towards and away from each other, and in which the bellows has a wall structure formed to maintain a substantially constant internal pressure of entrapped fluid within the bellows, during extensile and retractile movements thereof.

12 Claims, 4 Drawing Figures

PRESSURE COMPENSATED FLEXIBLE BELLOWS

PRIOR ART

In the prior art there are numerous bellows structures of the accordian or collapsible type having wall portions formed with circumferentially extending convolutions. These bellows have been utilized as protective covers between a fixed member and a movable member such as a reciprocably mounted rod. The interior of the bellows is usually vented in order to prevent a build up of pressure during the retractile movements of the bellows. The closest art known to applicant comprises the following patents:

| | |
|---|---|
| 1,368,253 | February 15, 1921 |
| 1,485,233 | February 26, 1924 |
| 2,960,372 | November 15, 1960 |
| 3,186,722 | June 1, 1965 |
| 3,369,411 | February 20, 1968 |

BACKGROUND OF THE INVENTION

The present invention relates generally to extensile and retractile bellows structures.

It is common practice in the prior art to utilize extensile and retractile bellows structures to provide a protective cover in mechanical arrangements which may be exemplified by a moving rod operatively associated with a fixed cylinder or other guiding outer member, for the purpose of protecting the relatively movable parts against dirt, dust, fumes, moisture, or the like. Such bellows have also been utilized to seal in lubricants, fluids and other media. In the use of well known accordian types of bellows in organizations, where the ends are in sealed relation to the associated relatively movable parts, a problem is presented in that the extensile and retractile movements have a tendency to produce a pumping action on the media due to volume and pressure changes within the bellows interior. This pumping action is undesirable in many installations, since the pressure increase within the bellows has the effect of providing a spring loading which can interfere with the operation of the mechanism.

In order to alleviate the pressure problem in the bellows, various arrangements have been tried for venting the bellows interior. Such arrangements are shown in the U.S. Pats. of Johnston, No. 3,186,722 and Hines, No. 3,369,411. Venting arrangements are relatively costly and tend to reduce the beneficial effects produced by the bellows. For example, when the bellows is vented to the surrounding environment, the outlet must necessarily be equipped with a fine filter or other means to prevent dust from entering the interior of the bellows. It will be appreciated, that the venting solution is not adaptable to installations in which lubricants or other media must be contained, without loss, in the bellows.

In other venting arrangements, as shown in the prior art, attempts have been made to solve the problem by venting air into a much larger rigid receptacle in the case of oil well pumping equipment. However, these arrangements are complicated and of a size which prevents their employment under confined operating conditions in small devices such as push-pull cables and the like.

Another known solution is illustrated in U.S. Pat. of Wasley, No. 2,960,372, which uses a double-ended device and transfers the compressed media at one end through a passage to the expanding opposite end. Where the ends are remotely positioned, it becomes necessary to utilize connecting pipe lines or tubing which are of considerable length and cause porting problems. Thus, the transfer of fluid media from one bellows to the other is, as a practical matter, only possible when the distances are relatively short and the passages relatively large. Such a method is not readily adaptable for use in push-pull cable arrangements having limited clearances.

The present invention effectively solves the prior art problem by providing a single bellows structure which is pressure compensated and requires no venting connections.

SUMMARY OF THE INVENTION

The present invention relates generally to a unique protective bellows structure, and is more particularly concerned with a pressure compensated bellows susceptible of use with relatively small mechanisms such as a push-pull mechanism.

It is one important object of the herein described invention to provide an improved bellows structure of unique design, such that the internal pressure of entrapped air or other fluid within the bellows will be maintained substantially constant during extensile and retractile operations, without the necessity of external venting.

A further object is to provide a pressure compensated flexible sealed bellows structure in the form of a single unitary embodiment.

A further object resides in the provision of a protective sealed flexible bellows structure of the extensile and retractile type having a wall structure such that the internal volume and pressure of fluid therein will remain substantially unchanged during the extensile and retractile operations of the sealed bellows.

Another object is to provide an improved flexible sealed bellows structure having an elongated tubular wall formed to provide a plurality of longitudinal bellows sections, and in which certain of said sections are longitudinally extendable and contractable, and other of said sections are radially expandable and contractable.

Still another object is to provide an elongated flexible tubular bellows containing integrally formed longitudinal sections, in which at least one of the sections has an outer wall formed with longitudinally extending flutes, and at least one of the sections has an outer wall formed with surrounding convolutions.

Further objects and advantages of the invention will be brought out in the following part of the specification, wherein detailed description is for the purpose of fully disclosing several embodiments of the invention without placing limitations thereon.

BRIEF DESCRIPTIONS OF THE DRAWINGS

Referring to the accompanying drawings, which are for illustrative purposes only:

DESCRIPTION OF THE SEVERAL EMBODIMENTS

Figure 1:
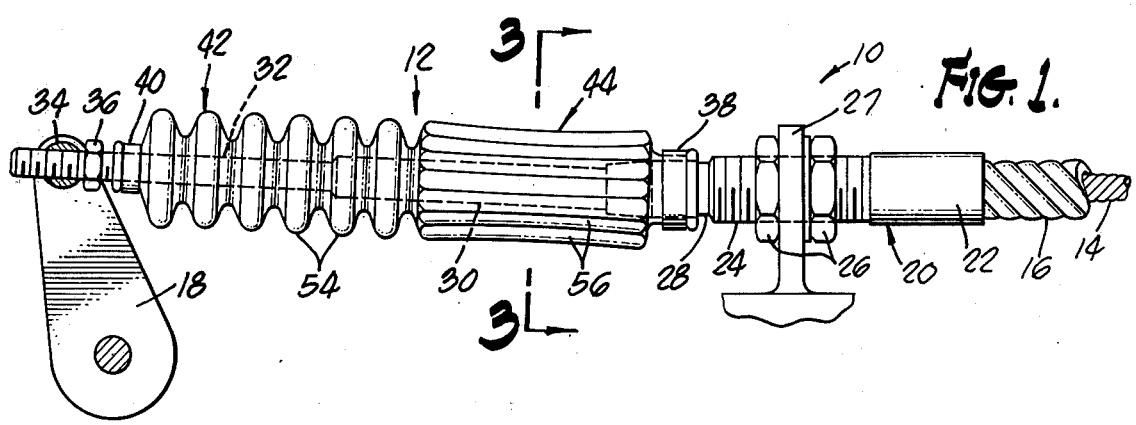
FIG. 1 is a fragmentary side elevational view of a bellows structure constructed according to the present invention, the bellows being applied to a push-pull mechanism.

Referring more particularly to the drawings, for illustrative purposes, the invention is disclosed in FIG. 1 as being applied to a push-pull cable mechanism, as generally indicated at 10, the bellows being generally indicated by the numeral 12.

The push-pull mechanism 10 may vary as to specific details of construction, and has been shown in a typical known arrangement for carrying out the connection of a flexible cable 14, which is supported for movement in opposite directions within a flexible conduit or casing 16, to an actuator element 18 of suitable form such as a crank, to translate the cable movements into the desired motion required for the actuated means.

In the illustrated arrangement, the cable casing 16 is terminated in a tubular anchor fitting 20 having a tubular end portion 22 adapted to receive the end terminus of the casing 16, and a threaded end portion 24 which is fitted with locking nuts 26 which enable the anchor fitting to be mountingly secured to a support structure such as a bracket or lug 27. An extension 28 extends beyond the threads of the end portion 24 and is suitably fabricated to provide an interlocking swivel connection with the inner end of a tubular guide member 30, this guide member forming a mounting for a reciprocable rod 32 having one end connected with the cable 14. The other end of the rod 32 is threaded for connection with the outermost end of the actuator element 18 or other part of an actuating mechanism. In the illustrated mechanism, the threaded end of the rod 32 is engaged with a pivot member or crank pin 34, and a lock nut 36 is provided for retaining the threaded end of the rod in its longitudinally adjusted connected position.

In some installations, the tubular guide member 30 will be in axial alignment with the anchor fitting 20, and will remain in this position during actuating reciprocal movements of the rod 32. However, in some installations, for example, when the rod 32 is connected with a crank member, the end of the guide member 30 which is connected with the end extension 28 will include an appropriate swivel connection, not shown, in order to accommodate angular swinging movements of the rod 32 during push-pull operations.

It is the purpose of the bellows 12, when utilized in a push-pull mechanism as shown in FIG. 1, to form a protective covering around the relatively moving parts of the push-pull mechanism and which can be sealingly connected at one end as by a clamp 38 to the end extension 28, and by means of a clamp 40 to the movable rod 32. As thus arranged, it will be appreciated that the bellows 12 will be extended and retracted in response to the push-pull operations of the mechanism.

While the bellows of the present invention has been described above as being embodied in a push-pull mechanism, it will be appreciated, of course, that the use of the bellows is not limited to a push-pull mechanism, but is adaptable for use in a variety of different structures, where it is desired to sealingly enclose a connection between relatively reciprocable moving parts.

Figure 2:
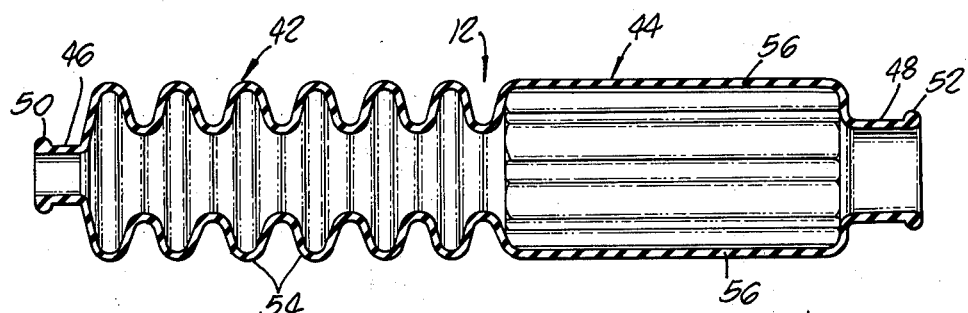
FIG. 2 is an enlarged longitudinal section of a bellows structure such as illustrated in FIG. 1, and showing structural details of the surrounding wall.

The bellows of the present invention is unique in that it embodies a single structural unit which is pressure compensating, and does not have to be vented to the environment. The details of construction of the bellows are best seen from a consideration of FIG. 2 of the drawings. The bellows is of elongated tubular construction and has a surrounding wall which is preferably of uniform thickness and formed from a suitable flexible material, such as rubber, synthetic rubber, or suitable flexible plastic. In the form shown in FIG. 2, the bellows is fabricated to provide a series of longitudinal sections, a section 42 and a section 44, these sections being integrally joined in end-to-end relation and having their opposite ends formed with projecting end nipples 46 and 48 respectively to facilitate their sealing connection as by the clamps 40 and 38. Preferably the nipples are provided at their ends with circumferentially extending beads 50 and 52. Nipples of other configuration may be provided, if desired, such as tapered, conical, stepped, etc.

The principal feature of the bellows of the present invention, resides in the manner in which the surrounding walls of the sections are constructed in order to provide for pressure compensation. As will be seen, the section 42 is provided with a plurality of surrounding convolutions 54, while the section 44 is provided with a plurality of longitudinally extending flutes 56. While the section 44 has been shown as transversely having a generally cylindrical configuration with the flutes 56 in uniformly circumferential spaced relation, it is to be understood that the invention contemplates the use of other transverse configurations and flute spacings. The sections 42 and 44 are preferably confined within a uniform maximum diameter and are so relatively proportioned that the sections respectively enclose internal chambers having substantially the same volumetric capacity.

Figure 3:
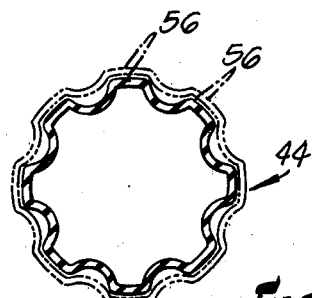
FIG. 3 is an enlarged transverse sectional view taken substantially on line 3—3 of FIG. 1, and diagrammatically illustrating the change in wall configuration to compensate for increased pressure within the bellows.

With the above described construction, it will be readily apparent that when the ends of the bellows are moved towards each other, the convolutions of the section 42 will be compressed, and there will be a flow of entrapped fluid, such as air, from the section 42 into the section 44, and that as a result of this flow the volume in section 44 will tend to increase the pressure therein. Under the increasing pressure in section 44, the flutes 56 will tend to expand radially to a position as shown in phantom lines in FIG. 3, and that as the result of this expansion, the volume of section 44 will increase in such a manner that the overall internal pressure within the bellows will remain at a substantially constant value. When the ends of the bellows are again moved outwardly to their normal position, there will be a reversed interchange of fluid from the section 44 to the section 42.

Figure 4:
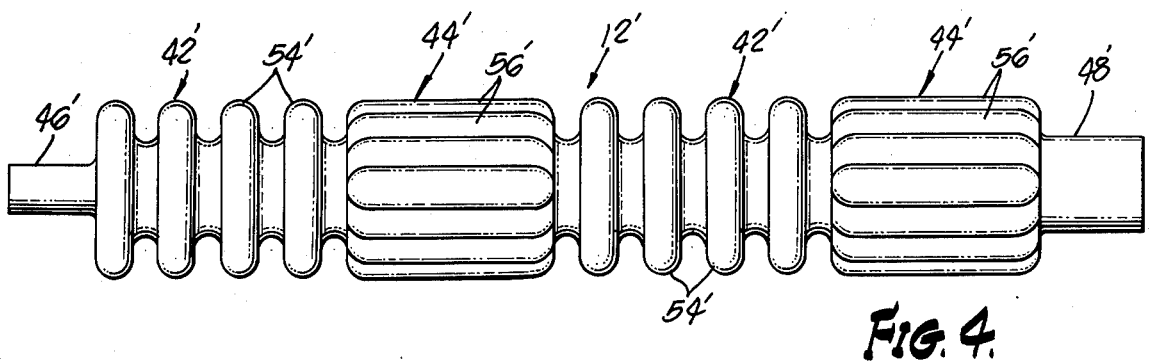
FIG. 4 is an enlarged plan view of a modified bellows construction, according to the present invention.

FIG. 4 of the drawings illustrates a modified form of the present invention in which the corresponding parts are indicated with primed numbers. The modified form differs from that which has been previously described in that instead of being composed of only two sections, the bellows has a plurality of sections 42' and 44', these sections being arranged in alternating relationship. The operation of the modified form is the same as that for the form previously described.

From the foregoing description and drawings, it will be clearly evident that the delineated objects and features of the invention will be accomplished.

Various modifications may suggest themselves to those skilled in the art without departing from the spirit of my invention, and, hence, I do not wish to be restricted to the specific forms shown or uses mentioned, except to the extent indicated in the appended claims.

I claim:

1. An internal pressure compensated flexible bellows for protecting a moving mechanism, comprising:
   a. an axially extendable and contractable elongated tubular member having flexible surrounding deformable wall sections and being formed at its opposite ends to respectively provide a turbular connector;
   b. self-contained means including said surrounding wall sections for maintaining a substantially constant internal pressure of fluid entrapped within said bellows by the closure of said tubular end connectors, during longitudinally extended and contracted movements of said bellows; and
   c. in which said wall comprises at least one section capable of radial expansion and contraction, and at least one other section capable of longitudinal extension and contraction.

2. A bellows according to claim 1, in which said sections have interconnected internally communicating adjacent ends, whereby said entrapped fluid is freely movable between said sections.

3. A bellows according to claim 1, in which the wall of said one section is formed to provide a plurality of longitudinally extending flutes, and the wall of said other section is formed to provide a plurality of surrounding convolutions.

4. A flexible bellows for enclosing and sealing a connection between elements supported for relative movements towards and away from each other, comprising:
   a. an axially expansile and retractile elongated tubular member of a flexible wall material, adapted to envelope the connection between said elements and to have its opposite ends respectively sealingly connected to the elements;
   b. said tubular member having at least one portion of its surrounding wall length formed to provide a plurality of longitudinally extending flutes, whereby the wall of said portion is permitted to radially expand, when the sealed ends of the bellows are moved towards each other, to substantially prevent a build up of pressure in the entrapped air or other fluid within the bellows.

5. A bellows according to claim 4, in which the tubular member also has at least one other portion of its length formed to provide a plurality of surrounding convolutions, whereby the wall of said other portion is permitted to longitudinally compress during said movement of the sealed ends towards each other.

6. A bellows according to claim 5, which includes a plurality of portions corresponding to said one portion and a plurality of portions corresponding to said other portion, said portions being arranged in alternating relationship.

7. A bellows according to claim 5, in which the opposite ends of said tubular member are each formed to provide an integral projecting connecting nipple having an end edge bead to retain an associated clamping band thereon.

8. A bellows according to claim 5, in which said sections normally conform to corresponding overall maximum diameters, and in which the overall diameter of said one section is increased, during said movement of the sealed ends towards each other.

9. A bellows according to claim 5, in which said portions are relatively so proportioned with respect to their internal volumetric capacity that, during said movement of the sealed ends, the increase in volume of said one portion will substantially equal the decrease in volume of said other portion, whereby to maintain an overall substantially constant volume within said bellows.

10. A flexible bellows, comprising:
    a. an elongated tubular member of flexible material;
    b. said member having a pair of sections in end-to-end flow connected relation extending between end walls of said member, one of said sections having a wall structure enabling radial deformation movements for changing the enclosed volume thereof, and the other of said sections having a wall structure enabling longitudinal extension and contraction movements for changing the enclosed volume thereof; and
    c. tubular connection nipples respectively carried by said end walls.

11. A flexible bellows according to claim 10, in which the wall structure of said one of said sections is comprised of longitudinally extending flutes, and the wall structure of said other of said sections is comprised of a plurality of surrounding convolutions.

12. A flexible bellows according to claim 11, in which a plurality of said one and said other sections are disposed in alternating relationship.

* * * * *